United States Patent

[11] 3,584,777

[72] Inventors Calvin D. Loyd
Peoria;
Ronald L. Satzler, Metamora, both of, Ill.
[21] Appl. No. 783,043
[22] Filed Dec. 11, 1968
[45] Patented June 15, 1971
[73] Assignee Caterpillar Tractor Co.
Peoria, Ill.

[54] TAILSTOCK AND FEED MEANS THEREFOR
9 Claims, 6 Drawing Figs.
[52] U.S. Cl. ................................................. 228/2,
29/470.3, 228/2, 269/234, 279/4
[51] Int. Cl. ....................................................... B23k 23/00
[50] Field of Search........................................... 279/4;
269/20, 25, 26, 30, 31, 234; 228/2; 29/470.3;
156/73

[56] References Cited
UNITED STATES PATENTS

| | | | |
|---|---|---|---|
| 2,480,762 | 8/1949 | Parker........................... | 279/4 X |
| 2,850,926 | 9/1958 | Jobe.............................. | 269/234X |
| 3,192,600 | 7/1965 | Jones............................ | 269/234 X |
| 3,234,646 | 2/1966 | Hollander et al. ............. | 29/470.3 |
| 3,235,162 | 2/1966 | Hollander...................... | 228/2 |
| 3,435,510 | 4/1969 | Oberle et al. .................. | 29/470.3 |

*Primary Examiner*—John F. Campbell
*Assistant Examiner*—Robert J. Craig
*Attorney*—Fryer, Tjensvold, Feix, Phillips and Lempio

ABSTRACT: A tailstock in which the work is firmly held in blocks which are biased together by hydraulic and/or spring means. A formula for determining whether the workpiece will be held within the blocks during friction or inertia welding. Work is fed into the rear of the tailstock from a hopper and delivery means when the pressure forcing the blocks together is temporarily relaxed.

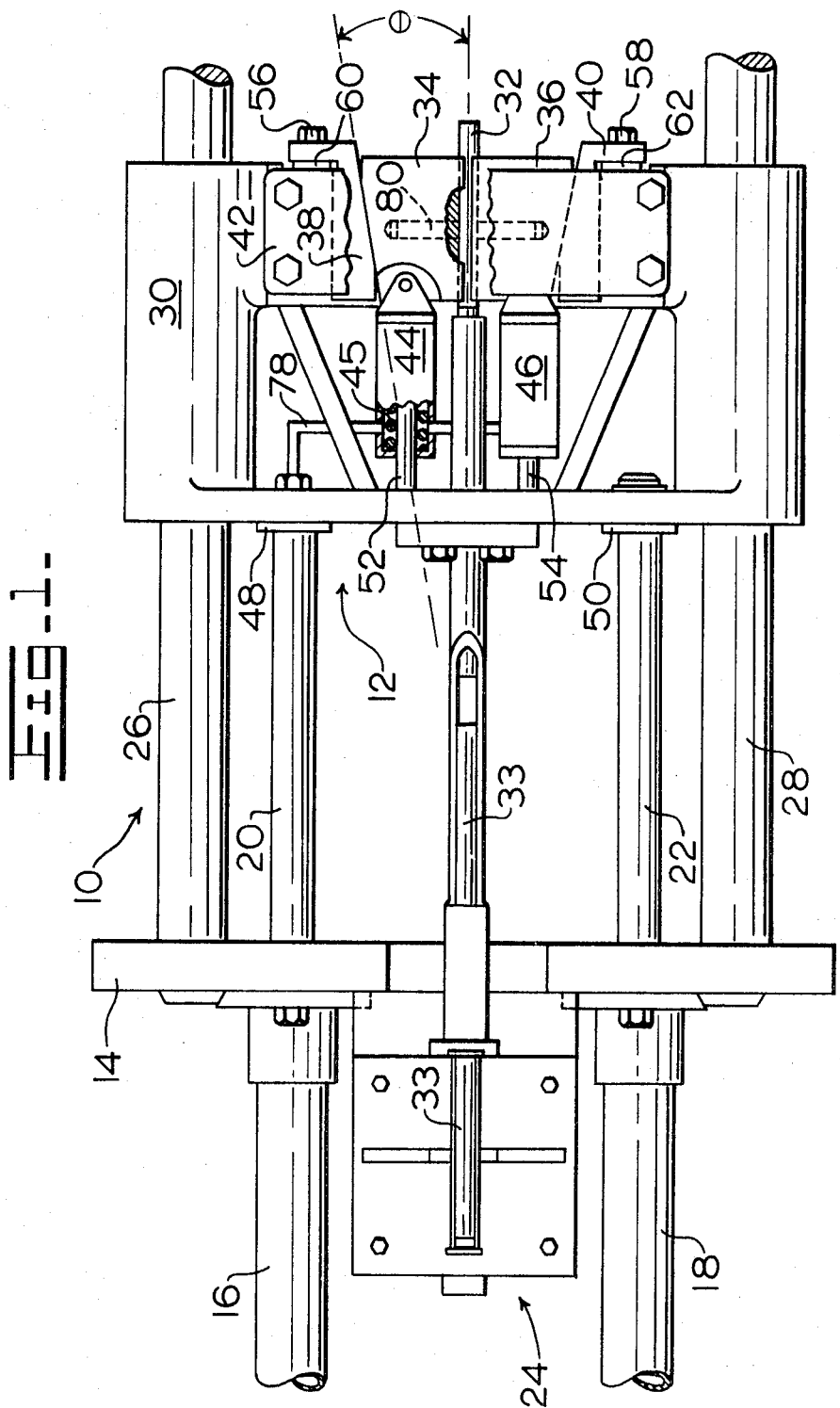

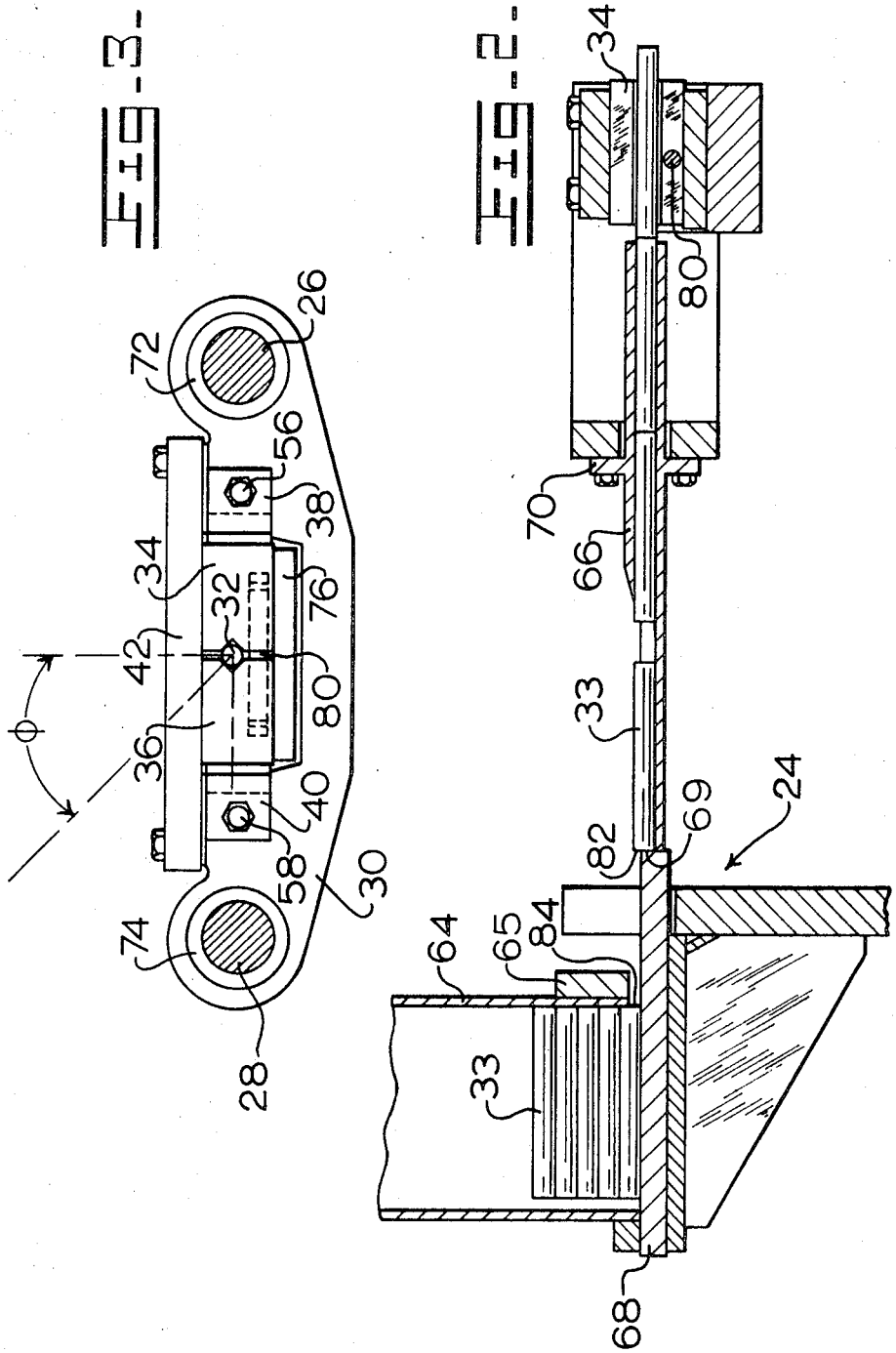

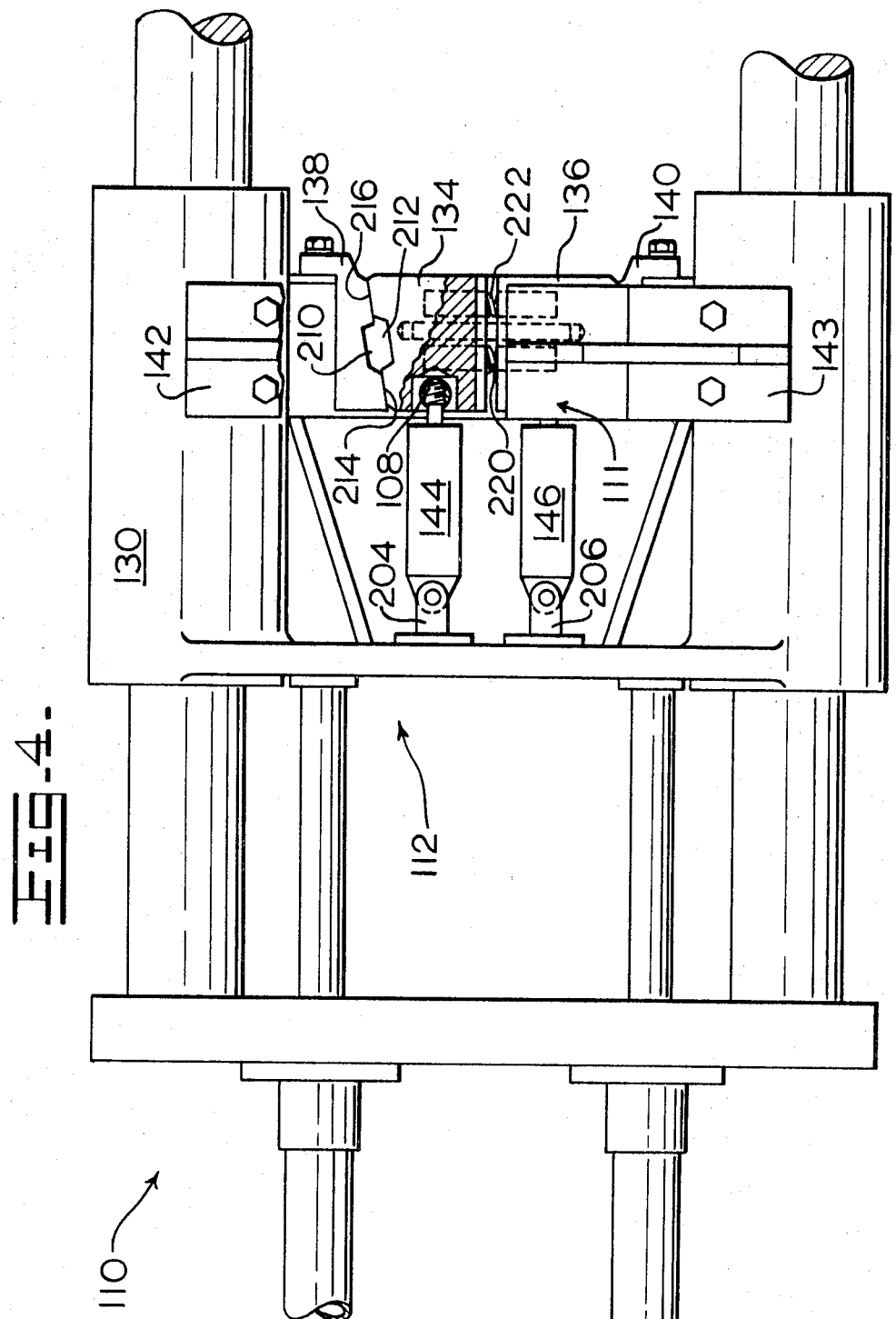

TAILSTOCK AND FEED MEANS THEREFOR

SUMMARY OF THE INVENTION

Although there are many applications for automatically fed tailstocks, it is becoming increasingly important that such devices be provided in machines capable of performing friction or inertia welding as described in U.S. Pat. No. 3,273,233. In order to use these machines in the most efficient manner, it is necessary that there be no lost time due to hand loading or chucking of the workpieces. It is also preferable that mechanisms used for automatic clamping and holding of the nonrotating weld pieces be as uncomplicated as possible. On the other hand, in view of the great forces generated and then exhausted at the interface of the weld pieces, the machinery must produce adequate holding forces without allowing slippage of the stationary weld piece.

It is therefore an object of this invention to provide such a tailstock which is relatively simple in design and economical to manufacture and maintain.

It is also an object of this invention to provide such a tailstock which eliminates lost time due to hand loading and chucking of the stationary workpiece.

It is a further object of this invention to provide such a machine which obviates the need for complicated loading arms and mechanisms and the circuitry required therefor.

It is also an object of this invention to provide such a means which utilizes the welding thrust force to increase the clamping forces exerted on the nonrotatable weld piece in a friction or inertia welding machine.

It is a still further object of this invention to provide such a device which produces precise centering of the nonrotatable weld piece with the rotatable weld piece.

It is also an object of this invention to provide such a machine in which the nonrotatable weld piece is automatically loaded and the welded product is automatically ejected from the tailstock.

It is also an object hereof to provide a method and formula for determining that the workpiece will be satisfactorily held between the blocks during friction or inertia welding.

Other objects and advantages of the present invention will become apparent from the following description and claims as illustrated in the accompanying drawings which, by way of illustration, show a preferred embodiment of the present invention and principles thereof and what is now considered to be the best modes contemplated for applying these principles. It is recognized that other embodiments of the invention utilizing the same or equivalent principles may be used and structural changes may be made as desired by those skilled in the art without departing from the present invention and purview of the appended claims.

BRIEF DESCRIPTION OF THE DRAWINGS

FIG. 1 shows a plan view of the tailstock assembly and work feed means therefor;

FIG. 2 is a sectional side view of the automatic work feeding means;

FIG. 3 is a partial front view of the workholding assembly;

FIG. 4 is a plan view of an alternate embodiment of the tailstock;

Referring now to the drawings in greater detail, FIG. 1 shows a tailstock assembly 10 consisting mainly of a workholding assembly 12, a back plate 14, hydraulic cylinders 16 and 18 with corresponding piston rods 20 and 22, and an automatic loading mechanism 24. Two parallel tie bars 26 and 28 connect the tailstock assembly 10 to the headstock (not shown) of the machine.

Figure 5:
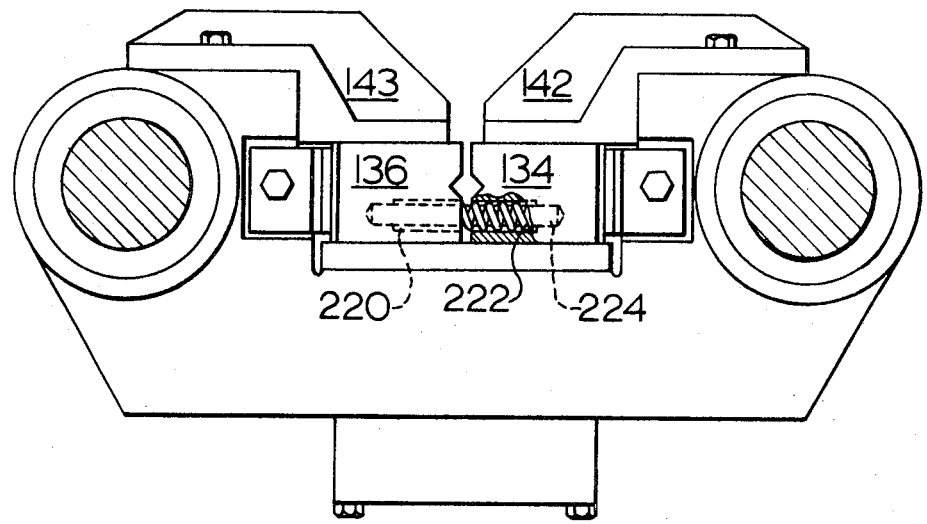
FIG. 5 is a view, similar to FIG. 3 of the alternate embodiment.

The parallel tie bars 26 and 28 pass through the workholding assembly 12, and this assembly is connected to the tie bars by means of linear motion ball bushings contained within a base member 30. These bushings allow the assembly 12 to travel along the tie bars when hydraulic fluid is supplied to the cylinders 16 and 18. As will be shown, the motion of assembly 12 along the tie bars causes the loading, positioning, and thrust required to weld the nonrotatable weld piece 32 to a rotatable piece (not shown) in a well-known manner. With one weld piece 32 being welded during each cycle of operation, several other workpieces 33 are maintained in a position behind the piece currently being welded.

The workholding assembly 12 is comprised of several members including the base 30, two tapered V-blocks 34 and 36, two tapered wedge blocks 38 and 40, a plate 42, and two small hydraulic cylinders 44 and 46. The base 30 is connected to the tie bars 26 and 28 as previously mentioned and is further connected to the hydraulic piston rods 20 and 22 by means of flanges 48 and 50.

The piston rods 52 and 54, of cylinders 44 and 46 respectively, are each attached by a pivot joint (not shown) to base 30, while the head ends of the cylinders are fastened to the tapered V-blocks 34 and 36. The tapered wedge blocks 38 and 40 are also fastened to base 30 by means of bolts 56 and 58. Shim packages 60 and 62 positioned between the tapered wedge blocks and base 30 control the centering of the weld pieces 32 between the tapered blocks 34 and 36. It is noted that the blocks 34 and 36 may be of any convenient workholding shape, but have been illustrated as V-blocks for the purposes of this disclosure. The centering of a workpiece between the blocks would normally be necessary only when initially setting up the machine. So as to insure accurate cooperation of the blocks, a pin 80 is mounted within a recess in each block, thereby insuring that the axial movements of the blocks are coordinated.

In FIG. 3, a front view of the workholding assembly 10 is shown. This figure illustrates how the parallel tie bars 26 and 28 pass through the base member 30 and how the linear motion ball bushings 72 and 74 encircle the tie bars. The blocks 34 and 36, the wedge blocks 38 and 40, bolts 56 and 58, weld specimen 32, and top plate 42 and bottom plate 76 are also clearly illustrated. The blocks 34 and 36 are fitted so as to slide freely between plates 42 and 76.

The tapered mating faces between the tapered blocks 34 and 36 and the wedge blocks 38 and 40 dictate that if enough force is applied to the tapered blocks to cause them to move to the left, in FIG. 1, a clamping force will be produced on the weld piece 32. For reasons which will become obvious, it is desirable to have a clamping load on the weld piece at all times. Therefore, a preloaded spring 45 is situated inside each of the small hydraulic cylinders 44 and 46 and it exerts a pressure between the normally stationary pistons and the movable housing in each cylinder. Thus, the tapered blocks have a force exerted on them at all times in order to hold the weld piece 32 with a clamping force.

In addition to the constant force exerted by the blocks on the weld piece 32, a much more intense clamping force is exerted on the weld piece by the blocks at the time of welding to the rotating weld piece. This larger clamping force is provided by the thrust force, which causes the blocks to tighten their grip on weld piece 32 and is also provided by supplying the two small hydraulic cylinders 44 and 46 with the same hydraulic fluid pressure which is applied to the tailstock moving cylinders 16 and 18. In this way the large welding thrust force is used to advantage to clamp and hold the nonrotating weld member during the welding operation.

The above phenomena will occur when the tapered blocks 34 and 36 and wedge blocks 38 and 40 are suitably designed. Such a design might, for example, be formulated by utilization of an equation such as:

$$\frac{(\cos\theta - \mu_w \sin\theta)\mu_v}{(\mu_w \cos\theta + \sin\theta)\sin\phi} \geq \frac{1}{(T+P)}\sqrt{\left(\frac{W}{D}\right)^2 + (T)^2}$$

where:

θ = One-half (½) the included angle of the wedge blocks as illustrated in FIG. 1 of the drawings.

Φ = The angle between the lines of contact between the V-blocks and the weld piece and a line perpendicular to the direction of the clamping force as illustrated in FIG. 3 of the drawings.

$\mu_w$ = Coefficient of friction between the V-blocks and the wedge blocks.

$\mu_v$ = Coefficient of friction between the V-blocks and the weld piece.

T = One-half (½) of the welding thrust force (lbs.).

P = The total force exerted on one wedge block by both the preload spring and the small hydraulic cylinder attached to the wedge block when the cylinder is pressurized.

W = The maximum torque value produced during a weld, as determined experimentally and measured in (lb.-in.).

D = Diameter of the weld piece (inches).

Since, in most cases, the factors relating to the weld member (T, P, W, and D) are relatively fixed or not easily changeable, the factors relating to the wedge and V-blocks (θ, Φ, $\mu_w$, and $\mu_v$) are normally the parameters which are changed, if necessary. In other words, for a given set of parameters, if it is determined from the equation that the V-blocks will not hold the weld piece from slipping during the weld thrust application, then the parameters relating to the wedge or V-blocks, or both, must be changed.

The most logical values to change would be the angles (θ and/or Φ), which are associated with the wedge and V-blocks. The coefficient of friction can be changed, but only within limited ranges.

If desired, the equation may be rewritten as:

$$\sin \phi \leq \frac{(T+P)(\cos \theta - \mu_w \sin \theta)\mu_v}{(\mu_w \cos \theta + \sin \theta)\left(\sqrt{\left(\frac{W}{D}\right)^2 + (T)^2}\right)}$$

From this equation, the angle Φ may be determined and selected and most materials can be held in the machine simply be selecting V-blocks in accordance with the required angle.

There is shown in FIG. 2 a more detailed illustration of the automatic loading mechanism 24 which consists primarily of a holder or hopper 64 which holds a supply of workpieces 33, a tubular member 66, and a plate 68 which is fastened to the tubular member and is situated under the hopper. The tubular member or chute 66 passes through a hole in the base 30 and is attached to the base by means of a flange 70. The workpieces 33, which are stacked in the hopper 64 rest on top of one another with the very bottom piece resting on the top of plate 68. The front portion of chute 66 is a full circular tube, whereas the back portion which is fastened to the plate is a troughlike member or semicircular piece.

In operation, with the tailstock assembly in the condition shown in FIG. 1, i.e., with a weld piece 32 held in the blocks 34 and 36 and several workpieces laying loosely behind the piece to be welded, the headstock of the welding machine which holds the rotatable weld piece is brought to the proper speed for welding. When the headstock of the inertia or friction welding machine has reached the proper velocity for welding, power to the motor driving the headstock is discontinued, and at the same time, hydraulic fluid is supplied to cylinders 16 and 18 of the tailstock workholding device, causing piston rods 20 and 22 to move to the right, thereby forcing the entire workholding assembly 12 to the right or toward the rotating weld member.

At the same time that the hydraulic fluid is communicated to cylinders 16 and 18, a portion of this fluid under the same pressure is also communicated to the smaller hydraulic cylinder 44 and 46 through a line 78. Line 78 may be fed through any suitable means, but is shown connected to the end of piston rod 20 which may have a hollow passage therein so that the fluid passes through the rod and into line 78. Thus, the small hydraulic cylinders are pressurized at the same time that the larger cylinders are pressurized. The pressure in the smaller cylinder causes the cylinder housing to move to the left and since the tapered blocks are fastened to the cylinder housings, they are also forced to the left causing them to grip the weld member 32 more tightly. As the weld pieces are brought together, an additional clamping force is transmitted, due to the welding thrust, through weld piece 32 to the blocks causing them to tend to move to the left and thus grip even more tightly. These combined forces acting on weld piece 32 will prevent any slippage during the welding operation. There is enough space between the workpieces behind weld piece 32 to allow the required movement to the left of blocks 34 and 36. Without space between the workpieces, the weld thrust force would be communicated through the workpieces to chute 66 and prevent blocks 34 and 36 from clamping and holding weld piece 32.

When the weld has been completed, the rotating headstock has come to rest and the chuck or fixture holding the rotating member loosened, the hydraulic pressure is released from the four cylinders. Since the axial welding force and the hydraulic holding force on the weld piece have now been released, the weld piece is held within the blocks only by the pressure of springs 45 within the smaller cylinders.

At this time cylinders 16 and 18 are pressurized on the opposite side of the piston thereof causing rods 20 and 22 to be drawn into the cylinders. This in turn draws the workholding assembly 12 to the left, or toward plate 14. As the assembly 12 moves to the left, plate 68 will move from underneath hopper 64 and chute 66 will become positioned beneath the hopper. As the chute moves underneath the hopper, the last workpiece 33 in the trough will abut the forward area of the bottom workpiece 33 held in the hopper 64.

Referring to FIG. 2, the abutting surfaces are designated as 82 and 84 respectively. Since the workpiece 33 in the hopper cannot move to the left as the chute continues to move toward the left, a force is exerted between the two pieces at the abutting surfaces 82 and 84. This force is transmitted to the workpieces further on in the chute, thereby forcing the welded piece 32 out of the blocks 34 and 36 while the next workpiece 33 moves into the blocks, becoming the new weld piece 32. Proper selection of springs 45 will allow the abutment force to overcome the preloads of the springs and thereby allow the weld pieces to pass between the blocks.

As chute 66 continues to move under the hopper, the trough will move directly under the bottom workpiece 33 which will drop into the chute. At this time movement of the assembly 12 stops and the hydraulic cylinders 16 and 18 are again pressurized to move the assembly 12 toward the welding position, thereby causing plate 68 to move to the right. Surface 69 on plate 68 will abut the bottom workpiece 33 and move it to the right out of hopper 64. The next piece above the bottom workpiece 33 is prevented from moving out of hopper 64 by block 65. As the bottom workpiece 33 moves out of hopper 64, the next piece drops down onto plate 68. The bottom workpiece can clear block 65 only after dropping into the trough of chute 66.

During the automatic loading of the tailstock, another rotatable weld piece will have been placed in the headstock of the machine and clamped ready for welding. The tailstock assembly then continues to move towards the rotatable piece until it is in position for welding of the next assembly, and the cycle may once again be repeated. It should be realized, that cylinders 44 and 46 could be eliminated if the tapered blocks are suitably designed, e.g., if the above equation is satisfied, but some device would still be needed for preloading the blocks for the purpose disclosed.

Figure 6:
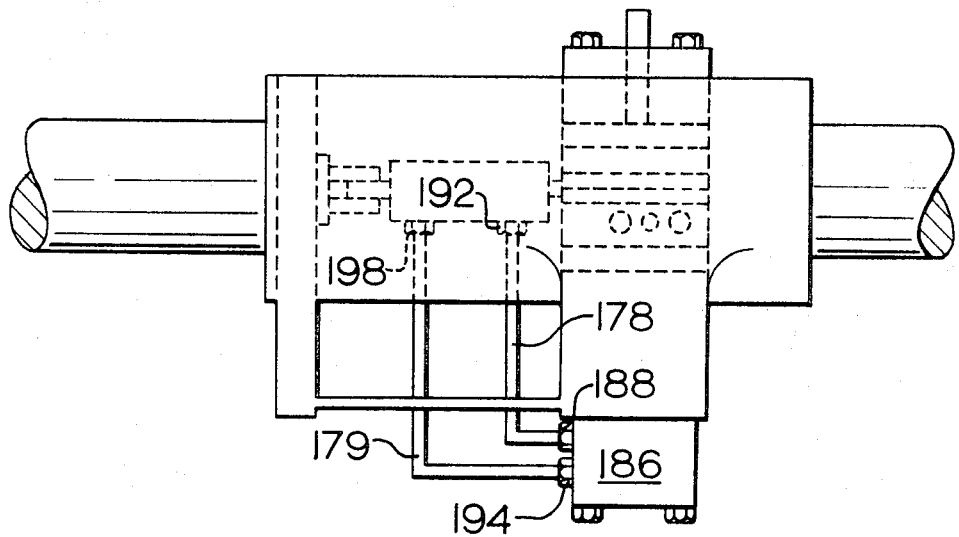
FIG. 6 shows a side view of the alternate workholding device with emphasis placed in this figure on the hydraulic portion of the device.

A modification of the workholding device is shown in FIGS. 4—6. For purposes of illustration, the automatic loading mechanism has been omitted in these figures for simplicity.

In FIG. 4 there is shown a tailstock of an inertia or friction welding machine 110 with a workholding assembly 112 for holding a nonrotatable weld piece during the welding process. The assembly 112 contains two small hydraulic cylinders 144 and 146, two tapered V-blocks 134 and 136, and two tapered wedge blocks 138 and 140. Two plate assemblies 142 and 143 may be bolted to the casting 130 and are situated above the tapered wedge blocks 138 and 140 and the tapered V-blocks 134 and 136.

It can be seen from FIG. 5 that plates 142 and 143 have been designed to facilitate the loading and unloading of the workpieces into the blocks if it should be desired to load the blocks from above. In FIG. 4, plate assembly 142 has been partly removed to show the details of the wedge block 138 and the block 134.

Hydraulic cylinders 144 and 146 are fastened on one end to casting 130 by assemblies 204 and 206 and on the other end to blocks 134 and 136 by assemblies 108 and 111.

The hydraulic cylinders 144 and 146 differ from cylinders 44 and 46 of the initial embodiment in that either side of the piston in the cylinders can be pressurized with hydraulic fluid and they contain no springs therein.

Referring to FIG. 6 it can be seen that the system for pressurizing cylinders 144 and 146 includes a manifold 186 with a port 188 and line 178 leading to a port 192 in the rod end of cylinders 144 and 146 and a port 194 and line 179 leading to ports 198 in the head end of the cylinders. Through this arrangement, the introduction of hydraulic fluid into the cylinders through ports 198 will cause the blocks 134 and 136 to move to the right and loosen the weld specimen, whereas introduction of hydraulic fluid into the cylinders through ports 192 will cause the blocks to move to the left and tighten onto the weld piece.

In order to facilitate a more rapid release of the weld piece after completion of the weld, a relief 210 has been machined near the center of each of the wedge blocks 138 and 140, and somewhat similar reliefs 212 have been machined near the center of the tapered area of blocks 134 and 136. When the hydraulic cylinders force the blocks to the right as shown in the drawings, in order to release the weld specimen, shoulders 214 of the tapered blocks will slide into the reliefs 210 of the wedge blocks and shoulders 216 of the wedge blocks will slip into reliefs 212 of the tapered blocks. This allows the blocks to be opened a relatively large distance and the weld piece can easily be removed from the fixture. Thus, the distance which the blocks must travel for such release is greatly reduced.

The separation of the blocks is aided through the use of coil springs 220 and 222 and a guide pin 224. The springs are placed inside drilled holes of the blocks so that when the blocks are clamped onto a weld specimen, the springs are compressed a predetermined amount. When the weld is completed and the blocks are being opened to remove the specimen, the coil springs 220 and 222 force the blocks into the reliefs so that the blocks open quickly. If desired, the springs could be replaced by other suitable means such as, for example, a small roller attached to each block and allowed to roll in a specifically shaped stationary cam slot.

Pin 224 is provided to insure the blocks work together and close at the same rate upon the weld piece. It may, therefore, be pressfitted into one of the V-blocks and loosely fitted into the other.

Although the alternate embodiment of FIGS. 4—6 does not show the automatic loading mechanism, it is obvious that the mechanism could be used with this tailstock assembly.

Thus has been disclosed an automatic tailstock and feeding device which permits a far more economical usage of a friction or inertia welding machine than has heretofore been available. The invention provides a relatively low cost, uncomplicated system which obviates lost time due to hand loading and chucking. While preferred embodiments of the invention have been described, other variations and modifications thereof falling within the purview of the following claims will be obvious.

We claim:

1. In a tailstock assembly, a base member, a pair of wedge blocks secured to the base member, a pair of tapered blocks each having a work-gripping surface thereon slidably positioned adjacent the wedge surface of a wedge block with said work-gripping surface facing away from said wedge block, actuating means fastened to said tapered block and said base whereby actuation of the actuating means move the tapered blocks in a direction parallel to the axis of a workpiece due to the force of the actuating means and also in a direction perpendicular to such axis due to the reactions with the wedge blocks, and means interconnecting said tapered blocks so as to insure that said tapered blocks move parallel to the axis of the workpiece in equal increments when said actuating means is actuated.

2. The assembly of claim 1 including means biasing said tapered blocks away from one another.

3. The assembly of claim 1 including means in said actuating means biasing said tapered blocks into a workpiece gripping position.

4. The assembly of claim 1 including means in said wedge blocks and said tapered blocks allowing greater movement in said perpendicular direction than allowed merely by the angle of taper therebetween.

5. In a tailstock assembly, a base member, a pair of wedge blocks secured to the base member, a pair of tapered blocks each having a work-gripping surface thereon slidably positioned adjacent the wedge surface of a wedge block with said work-gripping surface facing away from said wedge block, actuating means fastened to said tapered block and said base whereby actuation of the actuating means move the tapered blocks in a direction parallel to the axis of a workpiece due to the force of the actuating means and also in a direction perpendicular to such axis due to the reactions with the wedge blocks, and including means for feeding workpieces to said tailstock comprising a feed member mounted on said base member in such a position as to pass a workpiece through said base, the distal end of said feed member having means therein for receiving a workpiece, and a hopper means mounted above said receiving means for depositing workpieces therein.

6. The assembly of claim 5 including means for moving said base member and the structure attached thereto relative to said hopper.

7. The assembly of claim 5 including means attached to the distal end of said feed member for closing said hopper when said receiving means is not in receiving relationship relative to said hopper.

8. The assembly of claim 6 including means in said hopper causing the ejection of said workpiece from said gripping surfaces when said base member is moved toward said hopper.

9. A tailstock assembly for a friction welding machine of the kind in which the end surfaces of two parts to be welded are held in a rotatable headstock and a nonrotatable tailstock and are pressed together in a rotative rubbing contact under an axial load to heat the end surfaces to a weldable condition, said assembly including a base member, loading means for producing an axial load on the parts to be welded by moving the base member axially toward the headstock of the friction welder, a pair of wedge blocks secured to said base, a pair of tapered blocks each having a work-gripping surface thereon slidably positioned adjacent the wedge surface of a wedge block with said work-gripping surface facing away from said wedge block, said loading means being connected to said tapered blocks and said base whereby actuation of said loading means moves said tapered blocks in a direction parallel to the axis of a workpiece due to the force of said loading means and also in a direction perpendicular to such axis due to the action from said wedge blocks to exert a gripping force on a part to be welded which is positioned between the gripping surfaces of the pair of tapered blocks.